United States Patent
Kovalchick et al.

(10) Patent No.: US 8,104,929 B2
(45) Date of Patent: Jan. 31, 2012

(54) OUTDOOR LIGHTING FIXTURE USING LEDS

(75) Inventors: Daniel A. Kovalchick, Sinking Spring, PA (US); Alan Brink, Radnor, PA (US); James K. Madara, Douglassville, PA (US); Charles D. Lanyon, Pottstown, PA (US); Henrick A. Zabawski, Arlington Heights, IL (US); Andrey Sadchikov, Erie, PA (US); Richard Giardina, Erie, PA (US)

(73) Assignee: Spring City Electrical Manufacturing Company, Spring City, PA (US)

( * ) Notice: Subject to any disclaimer, the term of this patent is extended or adjusted under 35 U.S.C. 154(b) by 143 days.

(21) Appl. No.: 12/424,792

(22) Filed: Apr. 16, 2009

(65) Prior Publication Data

US 2010/0128475 A1 May 27, 2010

Related U.S. Application Data

(60) Provisional application No. 61/200,264, filed on Nov. 26, 2008.

(51) Int. Cl.
*F21V 29/00* (2006.01)

(52) U.S. Cl. .............. 362/294; 362/235; 362/296.01; 362/373

(58) Field of Classification Search .............. 362/235, 362/249.02, 227, 294, 296.01, 297, 296.08, 362/373, 240, 431
See application file for complete search history.

(56) References Cited

U.S. PATENT DOCUMENTS

| | | | | |
|---|---|---|---|---|
| 4,591,960 A * | 5/1986 | Jones | | 362/298 |
| 6,784,357 B1 * | 8/2004 | Wang | | 136/244 |
| 7,040,782 B2 * | 5/2006 | Mayer | | 362/350 |
| 7,431,477 B2 * | 10/2008 | Chou et al. | | 362/240 |
| 7,677,770 B2 * | 3/2010 | Mazzochette | | 362/364 |
| 7,963,668 B2 * | 6/2011 | Yin et al. | | 362/244 |
| 2006/0250803 A1 * | 11/2006 | Chen | | 362/373 |
| 2007/0086196 A1 * | 4/2007 | Wong | | 362/294 |
| 2007/0090737 A1 * | 4/2007 | Hu et al. | | 313/11 |
| 2008/0285271 A1 * | 11/2008 | Roberge et al. | | 362/235 |
| 2009/0147521 A1 * | 6/2009 | Zhang et al. | | 362/294 |
| 2009/0296392 A1 * | 12/2009 | Wilcox | | 362/249.02 |
| 2010/0079998 A1 * | 4/2010 | Mrakovich et al. | | 362/249.02 |

OTHER PUBLICATIONS

Sun Valley Lighting specifications brochure for LAE-LED: first publication date unknown, p. 2—Luminaire illustration.
King Luminaire Post Top Series brochure: first publication date unknown, pp. 5-6 "Central Array" illustrations; p. 7 "Indirect Array" illustration; p. 8 "Heat Control" text.

* cited by examiner

*Primary Examiner* — Evan Dzierzynski
(74) *Attorney, Agent, or Firm* — Drinker Biddle & Reath LLP

(57) ABSTRACT

An outdoor lighting fixture using LEDs as a light source has a decorative housing that includes a cast metal dome roof and one or more LED light engines, wherein the light engines conductive metal substrate is in conformal contact with a portion of the inner surface of the roof, such that the roof provides increased heat sink mass and the outer surface of the roof provides a heat dissipative surface area outside of the housing. Preferred embodiments include a street light wherein two LED light engines are mounted at about 20 and 160 degrees to a line parallel to the street segment to produce an asymmetric light profile that reaches over and along the street for an effective distance, but does not extend very far on the side away from the street. Also disclosed is a reflector module for an LED light engine having rows of cone reflectors modified to produce an effective emission pattern.

9 Claims, 6 Drawing Sheets

OUTDOOR LIGHTING FIXTURE USING LEDS

CROSS REFERENCE TO RELATED APPLICATION

This application claims priority from U.S. Provisional Application No. 61/200,264 filed on Nov. 26, 2008.

FIELD OF THE INVENTION

This invention is related to the general field of outdoor lighting and to the more specific field of LED outdoor lighting fixtures.

BACKGROUND OF THE INVENTION

Light Emitting Diodes ("LEDs") have several advantages for outdoor lighting over High Intensity Discharge ("HID") light sources, such as long life, lower energy consumption, durability, cold weather performance, directional orientation of beam patterns, instant on/off and controlled dimming without color change. In particular, the directional nature of the LED light gives the ability to create asymmetric light beam emission patterns by orienting and directing multiple LED light engines within the fixture, rather than relying solely upon reflectors and focusing lenses as in conventional light sources.

A major concern, however, when designing an LED outdoor fixture, is effective heat management. Heat at the semiconductor domain junctions is a primary determinant in the lifetime of the LED and in maintaining consistent wavelength. LEDs function better and last longer at cold or cool temperatures, and deteriorate more rapidly with increased heat. The design effort to draw heat away from the junctions has often resulted in the LED circuit boards being attached to a finned heat sink, with natural air convection or fans used for cooling. In an outdoor light fixture, however, the ambient temperature may at times be relatively high even at night, there may be little natural air movement in or around the fixture, and little ventilation from within the fixture. Hence, convection heat transfer is limited, and developing a different solution to heat management is a design criteria.

In addition to the utilitarian design considerations, outdoor pole and wall mounted luminaries are often decorative pieces, mimicking ornate gas lanterns and early incandescent street and park lighting. Some of the most ornate are cast metal housings that incorporate the architectural design elements of the locale or historical periods. Replacing the light source in such fixtures with LED lighting is a particularly challenging task, and one that is addressed in this invention.

BRIEF SUMMARY OF THE INVENTION

The invention relates to outdoor lighting fixtures that use LEDs as a light source. In particular; a fixture of this type includes a decorative housing that can be mounted upon a pole or wall, or hang pendant from a pole or wall. The profile and styling of the housing exterior may visually replicate the appearance of a cast metal lamp housing associated with particular architectural elements of location or period. An exemplary post top fixture, as shown in the accompanying drawings, is of the style recognized as a "Franklin Square" luminaire, named for a historical section of Philadelphia.

The Franklin Square luminaire, as with most cast metal luminaire styles, has a metal dome roof, light transmissive panel sides or globe, and a metal base for mounting it onto a street lamp pole. The term "dome" is used here in its broadest sense, as the shape may vary from rounded to include stepped layers, spires, corner posts and/or finials. In a pendant style fixture, the dome roof may be the lowest part of the metal casting, yet it is still the roof over the light source and light transmissive globe. The dome roof is preferably cast of aluminum alloy for both heat conduction and weight considerations. Electrical utility power is typically delivered by wires running inside the pole and into the housing through the base.

Inside of the housing is one or more LED light engines. Each light engine contains an array of LEDs on a circuit board. For outdoor street lighting, the color temperature of the white light is preferably in the CCT 2750-6000 range, with the warmer color range being preferred. The light engines are circuit board blocks containing a circuit board with LEDs that is mounted on a metal substrate, and have a reflector module having a polished metal finish and a full or partial reflector cone over each LED.

The LED circuit board may be printed on or attached to the metal substrate, sometimes described as a metal-core printed circuit board. The circuit board may be coated with a dielectric material. The metal substrate is preferably a steel or aluminum plate with its surface opposite the direction of LED light emission. The inner surface of the dome roof is dimensioned for an abutting conformal contact with the circuit board, so that the dome roof provides a substantially increased heat conducting mass compared to the mass of the circuit board substrate alone. In a preferred embodiment, the circuit board substrate is flat and the dome roof is cast to have flat platform surfaces at the inner locations where the light engines are attached. The inside surface of the dome roof may also have ribs abutting the sides of the circuit boards to increase the contact surface and create a larger path for heat migration from the circuit board into the roof.

The outer surface of the dome roof provides a large heat dissipative surface area outside of the housing, such that heat can be conducted over the roof's wide surface area and given off as convection to the atmosphere. To increase the outside surface area, the mold for the roof casting can be configured to produce a pattern of small grooves along the contour of the outside surface. The grooves will not detract from the appearance, since the orientation of the grooves and viewing distance when the fixture is mounted on a pole or wall makes the grooves virtually imperceptible. This ability for rapid convection loss of heat to the atmosphere outside of the fixture helps to maintain an effective temperature gradient to draw heat away from the LED circuit boards.

Using this cooling technology, LEDs operating in the 60-100 watt range of power consumption can replace a 150 watt metal halide lamp with equivalent lighting effect, yet have an average operating life of 70 percent or better lumen maintenance after 50,000 hours operation.

The outdoor lighting fixture can have a plurality of such LED light engines, as alluded to above. Each light engine circuit board has a surface in conformal contact with a portion of the inner surface of the roof, or the inner surface of the roof. Preferably the inner surfaced of the roof is cast to have flat mounting platforms at the desired light engine locations to accommodate flat circuit boards bases. This allows the multiple light engines to be oriented to produce an asymmetric beam profile from the fixture.

In a preferred example used to illuminate a street or pathway, two LED engines are oriented to generate two crossing beams that create an asymmetric emission pattern with a long axis along and over the street or path, and a short axis normal to the street or path to keep light from intruding into residences located behind the lamp post. This is accomplished by the mounting the two light engines along the inside wall of the dome roof at an angle to the parallel of approximately 25 degrees, and by the use of a special reflector module combining parabolic and elliptical reflector or reflector sections.

An LED driver to provide and regulate electrical power to the LED light engine or engines is located inside the housing and preferably attached to the base of the fixture, where it can receive line power from utility wires running inside the lamp pole and into the base. The driver converts the utility ac power to dc power at levels appropriate for the LED operation, and controls the levels to provide ON/OFF switching, dimming and other power control features.

An electrical power cable extends from the driver to the light engine or engines in the center of the fixture. The cable preferably has a quick disconnect plug into a wiring harness for the light engines.

When using a single centered light engine, a cone reflector positioned under the light engine can be used to reflect the light outward. As will be seen in the described embodiments, the cone reflector may be suspended on a stem that extends through an aperture in the central light engine and/or heat sink. The cone reflector directs light impinging upon it outwardly. This reflected light, and light directly from the centered LED light engine or engines, can be further baffled by a progression of reflector rings located between the cone reflector and the driver. The reflectors can be used to direct light out of the transmissive sides of the housing in a muted baffled pattern that creates the illusion of a center light source such as gas flame.

The roof portion of the housing is preferably cast as a separate piece from the base and globe support structure. This allows the roof to be removed for access to the LED engine(s) and driver for repair or replacement. The LED circuit board may be attached to the interior surface of the roof by screws or a heat conducting adhesive, such that the circuit board can be removed from the roof for replacement.

DETAILED DESCRIPTION OF EMBODIMENTS SHOWN IN THE DRAWINGS

Figure 1:
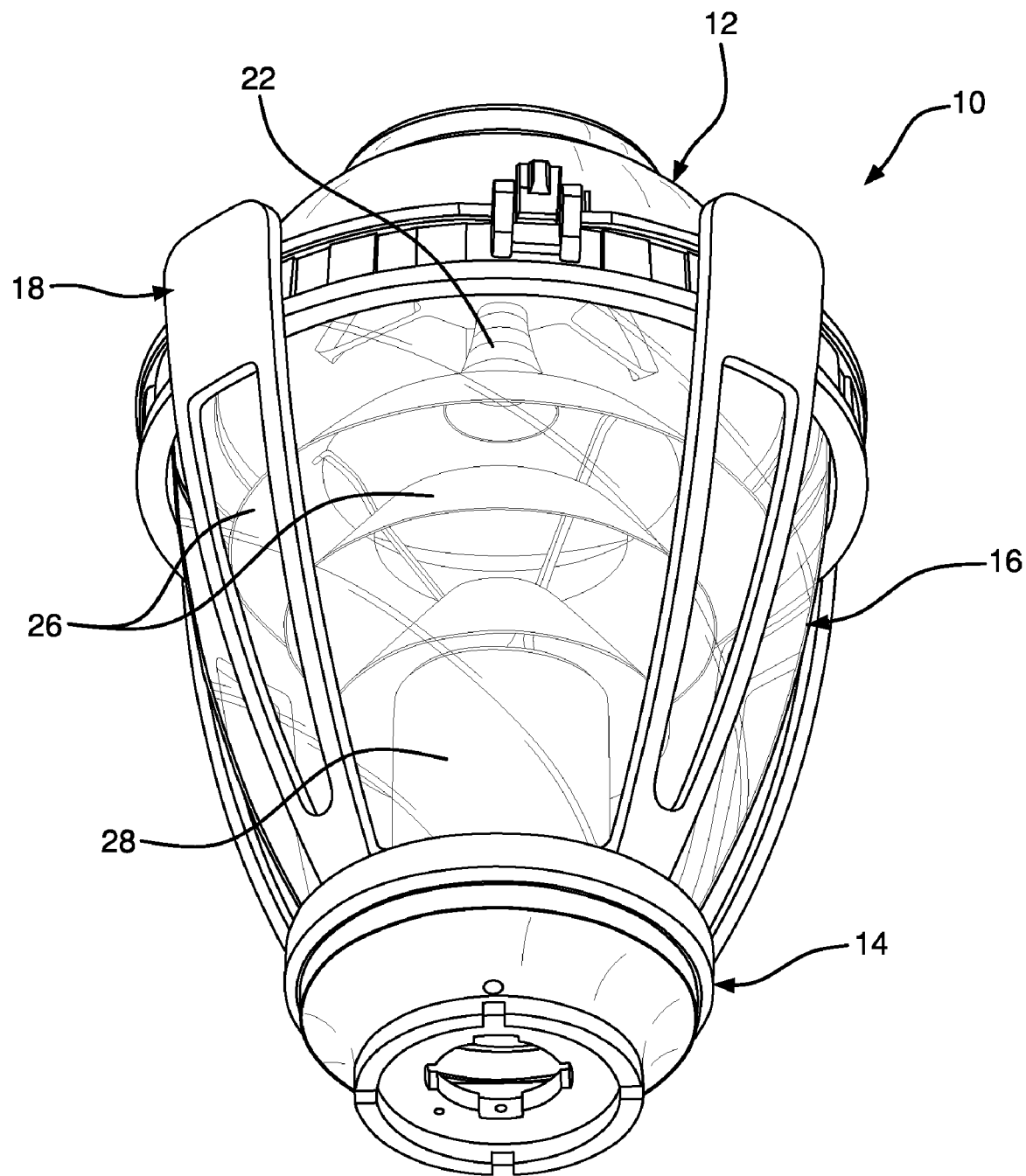
FIG. 1 is a perspective view of a light fixture decorative lamp housing for use with a single LED light engine. The light engine is omitted to show the detail of the roof where it is mounted.
Figure 2:
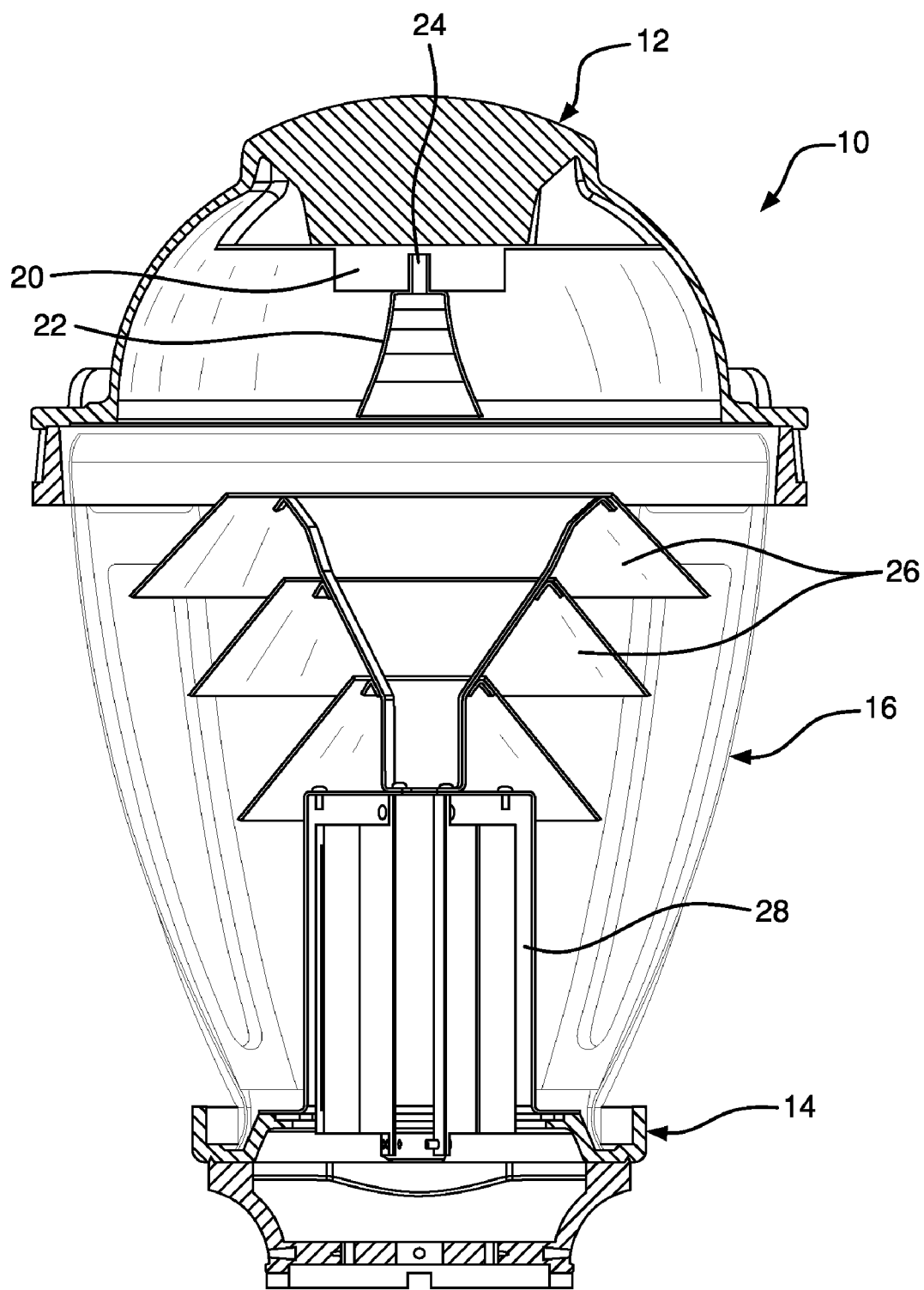
FIG. 2 is a vertical plane cross section view of a light fixture housing as in FIG. 1, with the LED light engine in place.

FIGS. 1 and 2 show an embodiment of a decorative lamp housing (10) for an outdoor lighting fixture using a single, centrally-located LED light engine. The housing includes a cast metal heat conducting dome roof (12), preferably of cast aluminum alloy, and a base (14), which may also be an aluminum alloy casting. The light transmissive sides (16) of the housing may be an acrylic or glass globe, or transmissive panels held within a supporting structure (18), and preferably have a diffusive surface, such as stippled or frosted pattern, to diffuse the light sufficiently to make it appear to be emitting in a surround pattern from the fixture rather than in a directional pattern.

The light engine (20) is a metal core LED circuit board block containing a plurality of LEDs. The circuit board is conventionally mounted on a conductive metal substrate, and emits light from the LEDs in a direction away from the substrate. The substrate's surface opposite the direction of LED light emission is mounted in abutting conformal contact with a portion of the inner surface of the dome roof (14) of the housing, so that the roof provides a substantially increased heat conducting mass over the mass of the metal substrate alone. In this embodiment, a cone reflector (22) is suspended under the light engine (20) to reflect light outwardly to the sides of the housing. The cone reflector may be mounted on a post (24) extending through the light engine. A progression of reflector rings (26) located between the cone reflector and the driver canister (28) baffle light out of the light transmissive sides of the housing.

Inside of the housing is electronic driver circuitry located in a protective canister (28). The driver converts a/c utility power to conditioned and regulated d/c power for use by the circuit boards. The d/c power may be supplied by an electrical power cable extending from the driver to the light engine.

Figure 3:
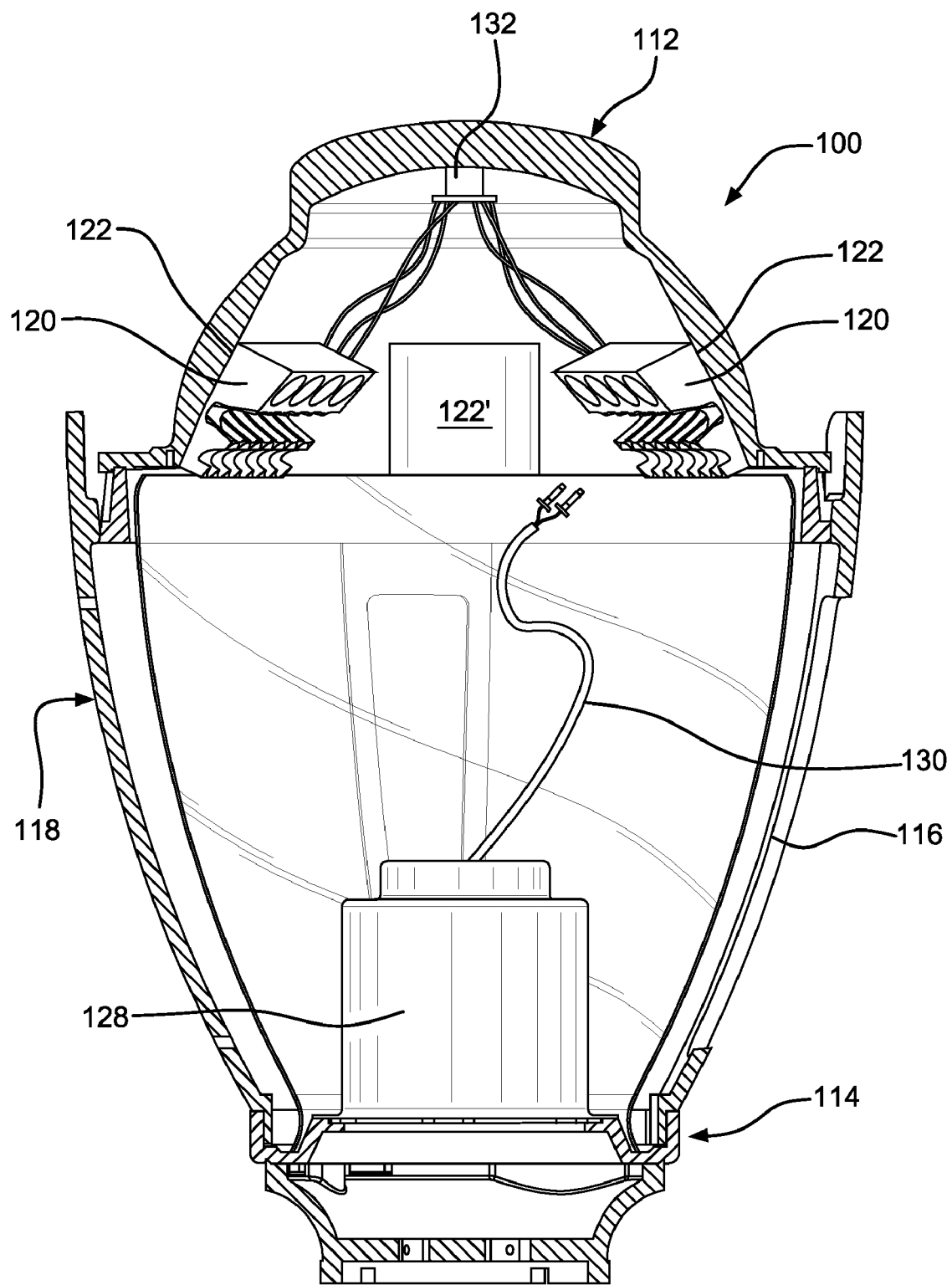
FIG. 3 is a partial section view of light fixture decorative lamp housing having two LED light engines positioned to create crossing lobes of light emission to effect an asymmetric light pattern aligned along a street or pathway.

FIG. 3 shows an alternative configuration of outdoor lighting fixture for providing street or walkway lighting from a pole mounted fixture alongside of a street or pathway. In this embodiment, the outdoor lighting fixture's decorative lamp housing (100) is essentially the same Franklin Square outward configuration as in the single light engine embodiment (10) of FIGS. 1 and 2. It includes a cast metal heat conducting dome roof (112), preferably of cast aluminum alloy, and a base (114). The light transmissive sides (116) of the housing may be an acrylic, polycarbonate or glass globe or transmissive panels held within a supporting structure (118), and the sides preferable have a diffusive surface, such as stippled or frosted.

Figure 4:
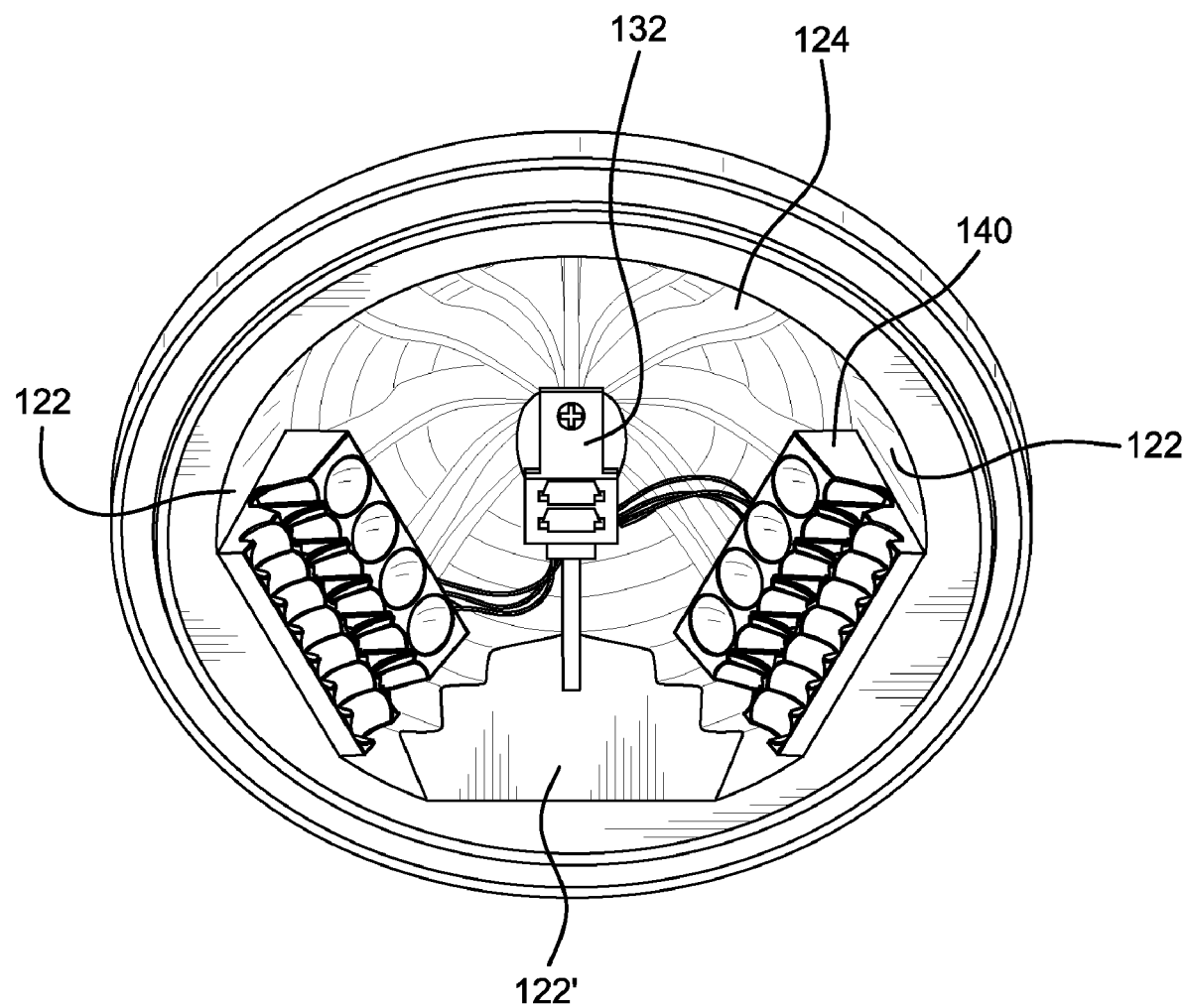
FIG. 4 is a view of the inside surface of the roof of the housing in FIG. 3 viewed from below, showing the placement of the light engines.

In this embodiment, however, two LED light engine packages (120) are used inside of the housing. Each light engine is mounted in an abutting conformal contact with a portion of the inner surface of the dome roof of the housing, so that the roof provides a substantially increased heat conducting mass over the mass of the metal substrate alone. The dome roof (112) has mounting flats (122) made by the casting process to accommodate the conformal contact. As shown in FIG. 4, the inner surface of the roof may also have cast ribs (124) running from the mounting flats to other portions of the roof to provide additional heat conduction pathways.

The inside of the housing contains electronic driver circuitry located in a canister (128). The driver converts a/c service power to conditioned and regulated d/c power for use by the circuit boards. The d/c power may be supplied by an electrical power cable (130) extending from the driver to a wiring harness (132) for distribution to the LED light engines.

Two LED light engines are used in this embodiment to produce an asymmetric light profile that reaches over and along the street for an effective distance, but does not extend very far on the side of the pole away from the street. This is accomplished by the orientation of the mounting flats (122) for the LED light engines. If a line parallel to the street were drawn through the fixture (110), the two light engines (120) may be placed along the inside walls of the dome roof with one at an acute angle to the parallel and the other at its complimentary angle, such as approximately 20 and 160 degrees. The light engines are also oriented to project at a slight downward angle, such as about 25 degrees, defined by the mounting flats (122). The combined light from the fixture is then emitted in two lobes that cross within in the fixture and expand outside of it to create an asymmetric overall light profile that reaches over and along the street for an effective distance, but does not extend very far on the side of the pole away from the street. This allows good street illumination without intruding upon residences along the street.

The dome housing may have an additional mounting flat (122') midway between the two that are at 20 degrees and 160 degrees to the parallel. If a third LED engine is mounted at this location, its beam pattern is essentially perpendicular to the street. This creates an effective pattern for parking lots or pedestrian parks where the light profile should reach relatively far across a perimeter street or fence, but not so far to the rear of it.

Other useful asymmetric patterns can be created with placement of multiple light engines. Each of the light engines can contact against a different portion of the inside wall of the roof, yet the roof will still provide the additional heat dissipation area outside of the housing and maintain the effective temperature gradient for heat transfer away from the light engines.

Figure 5:
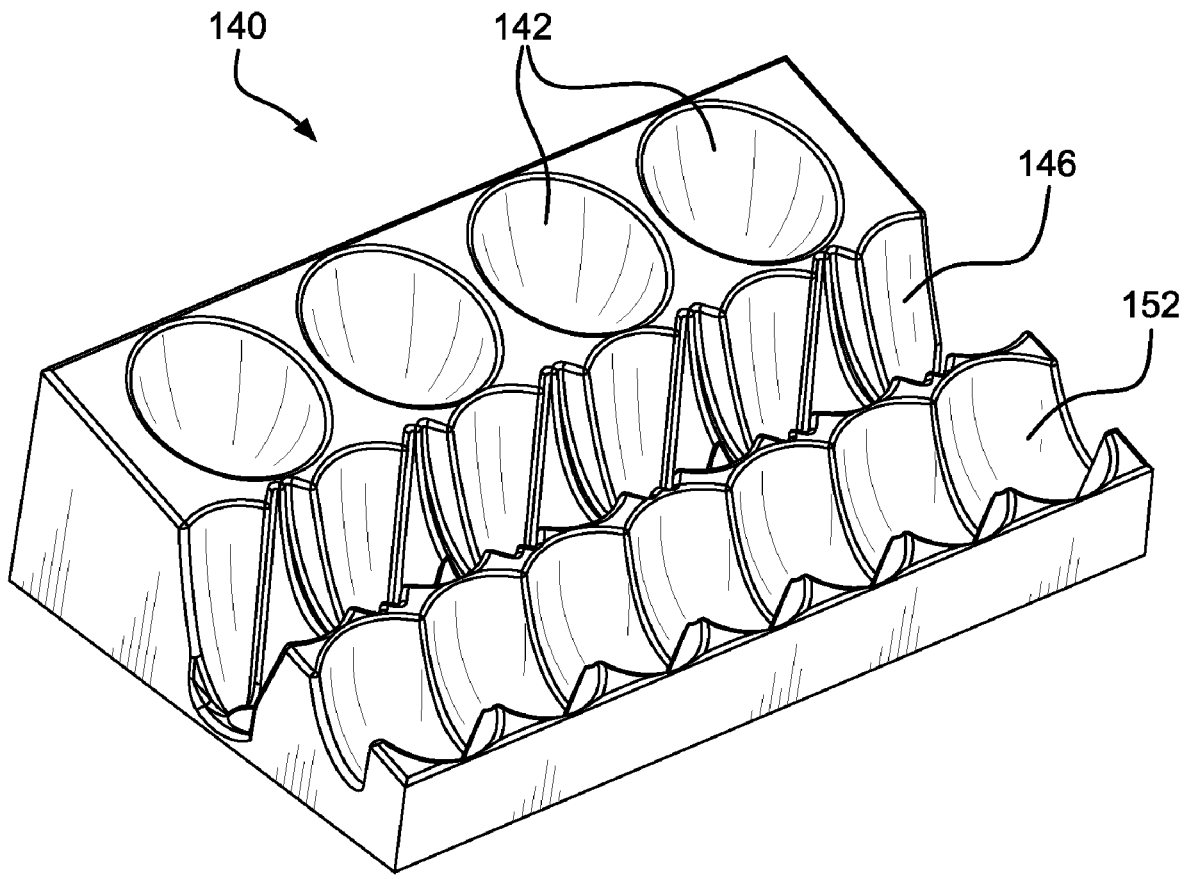
FIG. 5 is a top plan oblique view of a reflector module used on the LED light engines of FIG. 4.
Figure 6:
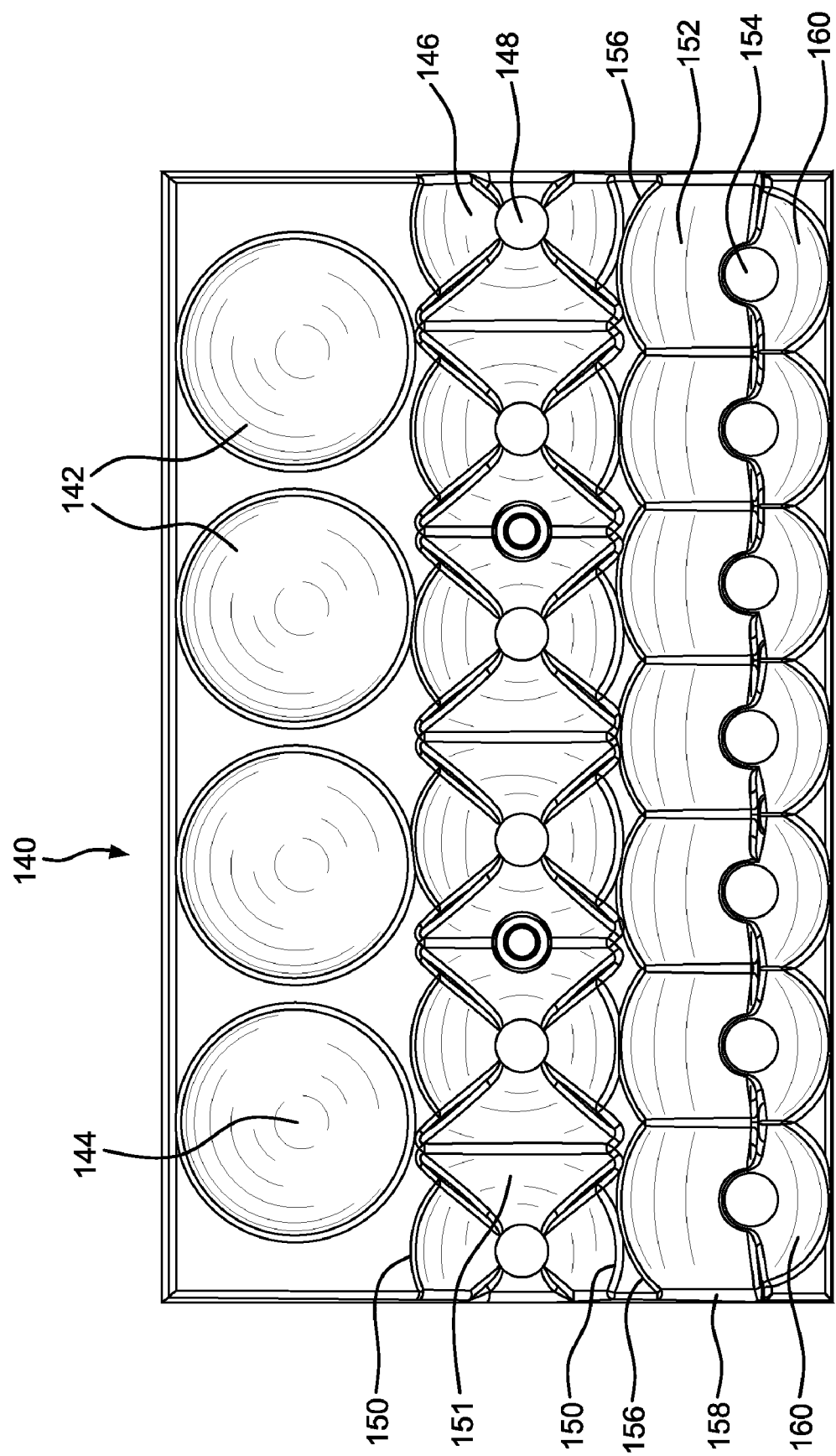
FIG. 6 is an overhead plan view of the reflector module of an LED light engine as in FIG. 5.

The light emission pattern and visual appearance of the light source can also be enhanced by the LED circuit board's reflector module. An embodiment of reflector module (140) that is preferred for use in the asymmetric pattern street lamp is shown in FIGS. 5 and 6. The reflector module (140) is preferably a heat insulating plastic cover coated with a reflective metalized finish. The cover is shaped to provide selective reflector focusing or scattering of the LED light emissions.

In this embodiment, the reflector module (140) has an upper row with four continuous cone reflectors (142) having an essentially parabolic shape with an LED emission lens (144) at the center. The parabolic shape with light emission near its focal point produces a light profile that is transmitted outward in a beam that is generally parallel to the axis of the cone reflector. This upper row of LEDs provide a depth component to the light emitted from the light engine. The reflector module (140) has a second, middle row of six-interrupted segment cone reflectors (146) each having an partially parabolic shape with an LED emission lens (148) at the center. The parabolic segments (150) of the reflectors (146) are located above and below the LED in the cover. The reflector surface is interrupted, however, at the sides of the cone. The side walls (151) of the cone are lower height and are curved to form a generally elliptical segment, and abut the similar reflector cone of the adjacent LEDS in the middle row. These parabolic segments provide a distance component to the beam, while the interruption segments produce a duplicating image of light along the axis of the middle row to hide the individual point sources. The reflector module (140) has a third, bottom row of seven composite segment cone reflectors (152), each with an LED emission lens (154) at the center. These composite cone reflectors have a generally elliptical segment (156) above the LED to produce wide angle downward reflection, interrupted lower side walls (158) to produce light scattering across the bottom row, and an essentially parabolic section (160) to gather light from escaping at the bottom of the cover and direct it outward along the axis of the parabola.

While the forgoing descriptions are used to show several embodiments, the invention is described by the claims which follow.

The subject matter being claimed is:

1. An outdoor lighting fixture using LEDs as a light source; the fixture comprising:
   (a) a decorative housing that includes a cast metal dome roof having an inner surface and an outer surface; and
   (b) a plurality of LED light engines, each light engine containing a plurality of LEDs on a circuit board mounted on a conductive metal substrate having a surface opposite the circuit board in conformal contact with a portion of the inner surface of the roof, wherein the roof provides increased heat sink mass and the outer surface of the roof provides a heat dissipative surface area outside of the housing, and
   (c) wherein two LED light engines are placed along the inside walls of the dome roof, with one engine located at an acute angle to a line through the housing 1 and the other engine at its complimentary angle to the line, such that the light from the two LEDs is emitted in lobes that cross within in the fixture and expand outside of it to create an asymmetric overall light profile.

2. An outdoor lighting fixture as in claim 1, wherein the dome roof is cast of aluminum alloy.

3. An outdoor lighting fixture as in claim 1, wherein the angles are approximately 20 degrees and 160 degrees.

4. An outdoor lighting fixture as in claim 3, further comprising the light engines being directed at a downward angle of about 25 degrees.

5. An outdoor lighting fixture using LEDs as a light source; the fixture comprising:
   (a) a decorative housing that includes a cast metal dome roof having an inner surface and an outer surface; and
   (b) two or more LED light engines, each containing a plurality of LEDs on a circuit board mounted on a conductive metal substrate having a surface opposite the circuit board in conformal contact with a portion of the inner surface of the roof, wherein the roof provides increased heat sink mass and the outer surface of the roof provides a heat dissipative surface area outside of the housing; and
   (c) at least one of the light engines has a reflector module that includes a cone reflector surface surrounding each LED, with some of the reflector surfaces being essentially parabolic reflectors.

6. An outdoor lighting fixture using LEDs as a light source; the fixture comprising:
   (a) a decorative housing that includes a cast metal dome roof having an inner surface and an outer surface;
   (b) three LED light engines, each light engine containing a plurality of LEDs on a circuit board mounted on a conductive metal substrate having a surface opposite the circuit board in conformal contact with a portion of the inner surface of the roof, wherein the roof provides increased heat sink mass and the outer surface of the roof provides a heat dissipative surface area outside of the housing, and
   (c) wherein the three LED light engines are placed along the inside walls of the dome roof, with one located at an acute angle to a line through the housing, another at its complimentary angle to the line, and the third located at approximately 90 degrees to the line such that the light is emitted in lobes that cross within in the fixture and expand outside of it to create an asymmetric overall light profile.

7. An outdoor lighting fixture using LEDs as a light source; the fixture comprising:
   (a) a decorative housing that includes a cast metal dome roof having an inner surface and an outer surface;
   (b) two or more LED light engines, each containing a plurality of LEDs on a circuit board mounted on a conductive metal substrate having a surface opposite the circuit board in conformal contact with a portion of the inner surface of the roof, wherein the roof provides increased heat sink mass and the outer surface of the roof provides a heat dissipative surface area outside of the housing; and
   (c) at least one of the light engines has a reflector module that includes a cone reflector surface surrounding each LED, the reflector module having an upper row at least four continuous cone reflectors and a lower row having additional cone reflectors having parabolic segments that are interrupted along their sides adjacent other reflectors in their row by side walls that are of lower height and are curved at a greater radius than the parabolic segments.

8. An outdoor lighting fixture as in claim 7, further comprising the reflector module having a bottom row below the lower row, the bottom row having additional cone reflectors that have a generally elliptical segment above the LED to produce wide angle downward reflection, interrupted and lower side walls along their sides adjacent other reflectors in the bottom row to produce light scattering across the bottom row, and an essentially parabolic section below the LED to gather light from escaping at the bottom of the module and direct it outward.

9. An outdoor lighting fixture having a decorative cast metal dome roof and light transmissive panel sides or bowl, and using as a light source a plurality of LED light engine containing LEDs on a circuit board, comprising:
   (a) the circuit board being mounted on a conductive metal substrate having a surface opposite the circuit board in conformal contact with a portion of an inner surface of the roof, without having an intermediate heat transfer device that uses liquid-vapor phase change disposed between the substrate and the inner surface of the roof, and
   (b) wherein the roof provides increased heat sink mass and an outer surface of the roof provides a heat dissipative surface area outside of the fixture.

* * * * *